(12) United States Patent
Egashira et al.

(10) Patent No.: US 7,643,567 B2
(45) Date of Patent: Jan. 5, 2010

(54) OFDM SIGNAL TRANSMITTING METHOD AND TRANSMITTER AND RECEIVER THEREOF

(75) Inventors: Yoshimasa Egashira, Yokohama (JP); Yasuhiko Tanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 559 days.

(21) Appl. No.: 11/641,726

(22) Filed: Dec. 20, 2006

(65) Prior Publication Data

US 2007/0147527 A1 Jun. 28, 2007

(30) Foreign Application Priority Data

Dec. 26, 2005 (JP) ............................ 2005-373571

(51) Int. Cl.
*H04K 1/10* (2006.01)
*H04L 27/28* (2006.01)

(52) U.S. Cl. .................. 375/260; 375/135; 375/146; 370/203; 370/206; 370/208; 370/295; 370/319; 370/344

(58) Field of Classification Search .............. 375/135, 375/146, 260; 370/203–211, 295, 319, 344
See application file for complete search history.

(56) References Cited

U.S. PATENT DOCUMENTS

2005/0195734 A1 * 9/2005 Sandell et al. .............. 370/208

OTHER PUBLICATIONS

"High-speed Physical Layer in the 5 GHZ Band," Part 11: Wireless LAN Medium Access Control (MAC) and Physical Layer (PHY) Specifications, IEEE Standard 802.11a-1999, pp. i-viii and 1-82, (1999).

* cited by examiner

*Primary Examiner*—Curtis B Odom
(74) *Attorney, Agent, or Firm*—Finnegan, Henderson, Farabow, Garrett & Dunner, L.L.P.

(57) ABSTRACT

A transmitting method of OFDM signal includes allocating first and second channel estimation preamble signals for channel response estimation respectively to +kth and -kth subcarriers from center frequency of first OFDM signal, allocating first and second pilot signals for residual phase offset estimation respectively to +kth and -kth subcarriers from center frequency of second OFDM signal, transmitting first and second OFDM signals respectively in different time zones using at least one antenna, where, first product of complex conjugate of first channel estimation preamble signal and second pilot signal is equal to second product of second channel estimation preamble signal and complex conjugate of first pilot signal.

15 Claims, 8 Drawing Sheets

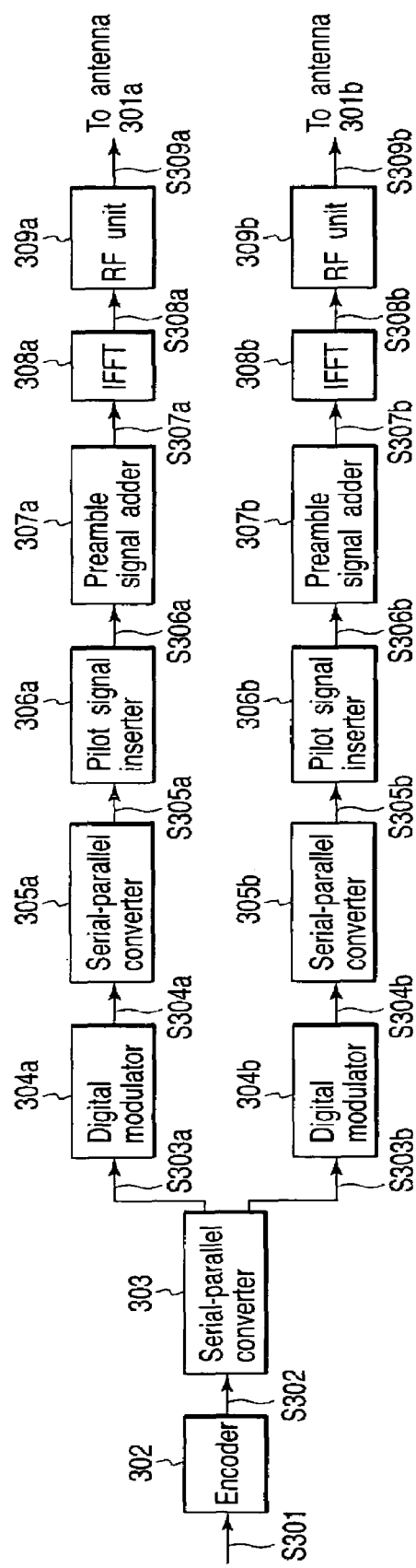
F I G. 6

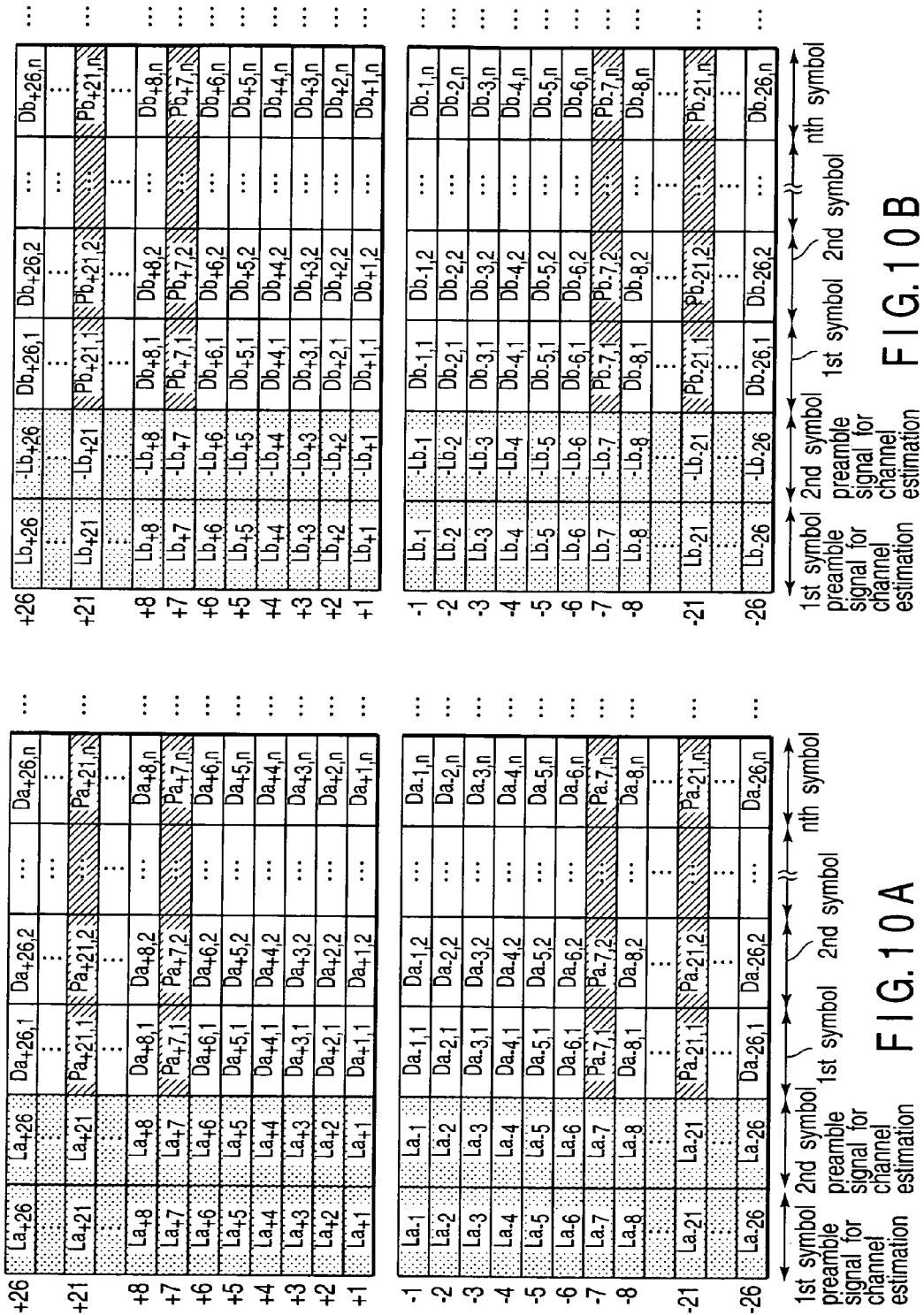

OFDM SIGNAL TRANSMITTING METHOD AND TRANSMITTER AND RECEIVER THEREOF

CROSS-REFERENCE TO RELATED APPLICATIONS

This application is based upon and claims the benefit of priority from prior Japanese Patent Application No. 2005-373571, filed Dec. 26, 2005, the entire contents of which are incorporated herein by reference.

BACKGROUND OF THE INVENTION

1. Field of the Invention

The present invention relates to a method for transmitting orthogonal frequency division multiplexing (OFDM) signals, and a transmitter and receiver thereof.

2. Description of the Related Art

In a multipath channel, in an environment where signals arrive with different propagation delay time, wave distortion caused by intersymbol interference can be a major factor of deteriorating communication quality. An orthogonal frequency division multiplexing (OFDM) scheme is known as a scheme to reduce wave distortion which occurs when receiving signals with different propagation delay time.

In the OFDM scheme, in order to compensate a residual phase offset attributable to clock offset or frequency offset, a method is known in which a known signal referred to as a pilot signal is allocated to a particular subcarrier and transmitted from a transmitting side as described in "High-speed physical layer in 5 GHz band part 11: Wireless LAN medium access control (MAC) and physical layer (PHY) specifications", IEEE 802.11a, "17.3.3 and 17.3.5.8 (referred to as document 1, hereinafter). At a receiving side, demodulation accuracy of a data signal is improved by estimating and compensating the residual phase offset using the pilot signal.

Generally, as an OFDM signal is transmitted as a complex signal, an orthogonal modulator is used at the transmitting side. In the orthogonal modulator, in some cases, an amplitude error or phrase error may occur between an inphase component and an orthogonal component, which is referred to as an IQ imbalance distortion. In the case of using the pilot signal described in document 1, in an environment in which an IQ imbalance distortion occurs, there is a problem that the residual phase offset of the data signal cannot be compensated sufficiently due to an error in the estimation of the residual phase offset component.

BRIEF SUMMARY OF THE INVENTION

According to one aspect of the invention, there is provided a transmitting method of an orthogonal frequency division multiplexing (OFDM) signal comprising: allocating a first channel estimation preamble signal and a second channel estimation preamble signal for channel response estimation respectively to a +kth subcarrier and a –kth subcarrier (k is at least one arbitrary integer) from a center frequency of a first OFDM signal; allocating a first pilot signal and a second pilot signal for residual phase offset estimation respectively to the +kth subcarrier and the –kth subcarrier from a center frequency of a second OFDM signal; and transmitting the first OFDM signal and the second OFDM signal respectively in different time zones using at least one antenna, wherein a first product of a complex conjugate of the first channel estimation preamble signal and the second pilot signal is equal to a second product of the second channel estimation preamble signal and the complex conjugate of the first pilot signal.

According to another aspect of the invention, there is provided a transmitter of the orthogonal frequency division multiplexing (OFDM) signal comprising: a first allocation unit configured to allocate a first channel estimation preamble signal and a second channel estimation preamble signal for channel response estimation respectively to a +kth subcarrier and a –kth subcarrier (k is at least one arbitrary integer) from a center frequency of a first OFDM signal; a second allocation unit configured to allocate a first pilot signal and a second pilot signal for residual phase offset estimation respectively to the +kth subcarrier and the –kth subcarrier from a center frequency of a second OFDM signal; and, a transmission unit configured to transmit the first OFDM signal and the second OFDM signal respectively in different time zones using at least one antenna, wherein a first product of a complex conjugate of the first channel estimation preamble signal and the second pilot signal is equal to a second product of the second channel estimation preamble signal and a complex conjugate of the first pilot signal.

According to another aspect of the invention, there is provided a receiver of the orthogonal frequency division multiplex (OFDM) signal comprising: a receiving unit configured to receive the first OFDM signal and the second OFDM signal transmitted from the apparatus of claim 4, to output a first receiving signal in the first OFDM signal zone, and to output a second receiving signal in the second OFDM signal zone; a first estimator to estimate the channel response using the first receiving signal, to obtain a first estimation value; a second estimator to estimate the residual phase offset using the first estimation value and the second receiving signal, to obtain a second estimation value; a compensator to carry out phase compensation of the data signal using the second estimation value; and, a demodulator to demodulate the data signal undergone phase compensation.

BRIEF DESCRIPTION OF THE SEVERAL VIEWS OF THE DRAWINGS

FIG. 6 is a block diagram of the OFDM transmitter according to the second, third and fourth embodiments.

FIG. 10A illustrates the subcarrier arrangement of the OFDM signal transmitted according to the fourth embodiment.

FIG. 10B illustrates the subcarrier arrangement of the OFDM signal transmitted according to the fourth embodiment.

DETAILED DESCRIPTION OF THE INVENTION

Hereinafter, embodiments of the present invention will be described in detail with reference to the accompanying drawings.

FIRST EMBODIMENT

Figure 1:
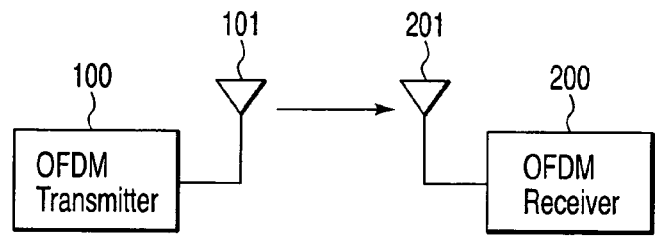
FIG. 1 illustrates an OFDM communication system according to a first embodiment.

As illustrated in FIG. 1, in an OFDM communication system according to a first embodiment of the present invention, an OFDM signal is transmitted from an OFDM transmitter 100 comprising a transmit antenna 101. The transmitted OFDM signal is received by an OFDM receiver 200 which comprises a receiving antenna 201. Here, the OFDM transmitter 100 and OFDM receiver 200 are described as respectively having one transmit antenna and one receiving antenna. However, the present invention is also effective in the case where they respectively have a plurality of transmit antennas and receiving antennas.

Figure 2:
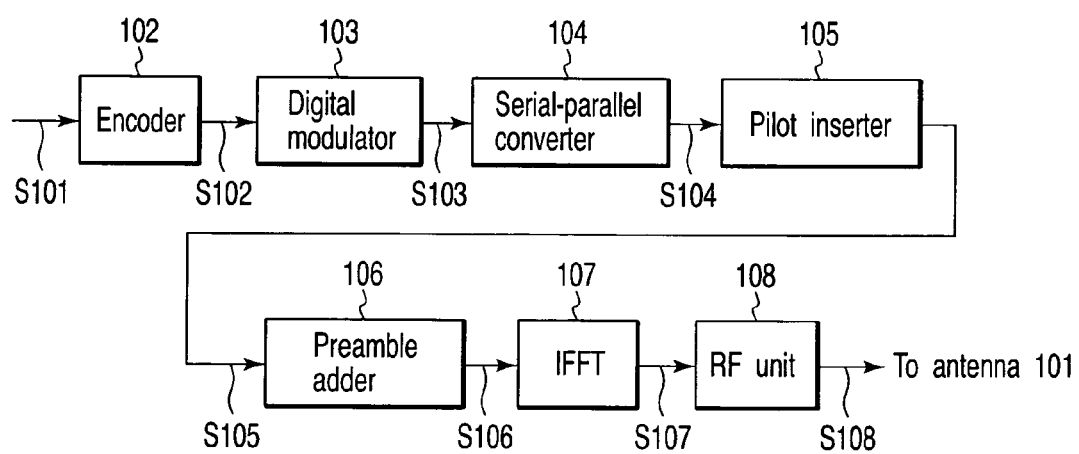
FIG. 2 is a block diagram of an OFDM transmitter according to the first embodiment.

The OFDM transmitter 100 illustrated in FIG. 1 will be explained in detail using FIG. 2.

The OFDM transmitter 100 comprises an encoder 102, a digital modulator 103, a serial-parallel converter 104, a pilot signal inserter 105, a preamble signal adder 106, an IFFT (inverse fast Fourier transition) unit 107 and an RF unit 108.

The input transmitting data S101 is coded by the encoder 102. The coded data S102 is subject to digital modulation by the digital modulator 103, such as by binary phase shift keying (BPSK), quadrature phase shift keying (QPSK), 16 quadrature amplitude modulation (16QAM) and 64QAM. The modulated data S103 output from the digital modulator 103 is allocated to a subcarrier (data subcarrier) used for transmitting a plurality of data signals, by the serial-parallel converter 104. In other words, the serial-parallel modulator 104 functions as a data signal to subcarrier allocation unit to allocate the data signal (in this case, the modulated data S103) to the data subcarrier.

The modulated data S104 allocated to the data subcarrier by the serial-parallel modulator 104 is input to the pilot signal inserter 105. The pilot signal inserter 105 inserts a pilot signal to the modulated data S104. The pilot signal is a known signal for residual phase offset estimation, which is allocated to a subcarrier (pilot subcarrier). In other words, the pilot signal inserter 105 functions as a pilot signal to subcarrier allocation unit for allocating the pilot signal to the pilot subcarrier.

The output signal S105 from the pilot signal inserter 105 is input to the preamble signal adder 106. The preamble signal adder 106 adds a channel estimation preamble signal which is a known signal for channel estimation before the signal S105. In other words, the preamble signal adder 106 functions as a channel estimation preamble signal to subcarrier allocation unit, which allocates the channel estimation preamble signal to a subcarrier (channel estimation subcarrier). The channel estimation hereby refers to estimating the impulse response of a channel (propagation path) (referred to as a channel response) between the transmitting side (the OFDM transmitter 100, in the present case) and the receiving side (the OFDM receiver 200, in the present case) as is well known.

The signal S106 output from the preamble signal adder 106 is subject to an inverse fast Fourier transformation by the IFFT unit 107. As a result of inverse fast Fourier transformation, the frequency domain signal S106 is converted into a time domain OFDM signal S107 and is input to the RF unit 108. In the RF unit 108, the time domain OFDM signal S107 is converted into an analog signal, which is then further converted into radio frequency and transmitted through the transmit antenna 101. Detailed explanations of the RF unit 108 will be omitted, as it has a general configuration, including, such as a digital-analog converter, a quadrature modulator, a filter or a power amplifier.

Figure 3:
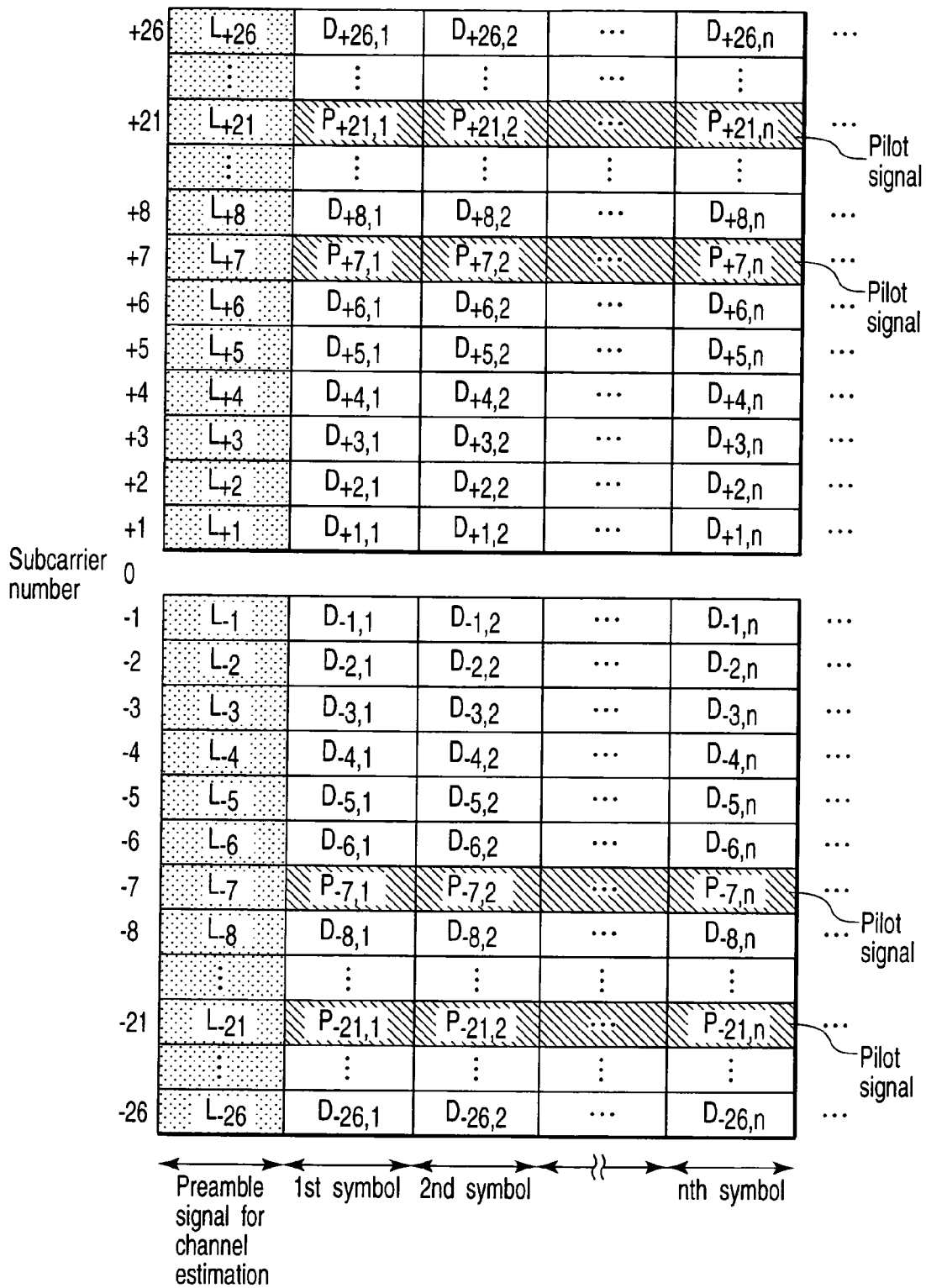
FIG. 3 illustrates a subcarrier arrangement of an OFDM signal transmitted according to the first embodiment.

Now, the frame structure of the OFDM signal transmitted by the OFDM transmitter 100 will be explained in detail, particularly, with regard to the structures of the channel estimation preamble signal and the pilot signal, using FIG. 3. In FIG. 3, the horizontal axis and the vertical axis respectively represent the time and frequency (subcarrier numbers).

The channel estimation preamble signals $L(k)$, $L(-k)$ are transmitted from the OFDM transmitter 100 as a first OFDM signal prior to transmitting the data signal. $L(k)$, $L(-k)$ represent the channel estimation preamble signals (or their values) which are respectively allocated to the +kth subcarrier and the -kth subcarrier. K is at least one arbitrary integer.

After the channel estimation preamble signals are transmitted, data signals $D(k,n)$, $D(-k,n)$ and pilot signals $P(k,n)$, $P(-k,n)$ are transmitted as a second OFDM signal of n symbol. $D(k,n)$, $P(k,n)$ respectively represent the data signal (or its value) and pilot signal (or its value) transmitted as the nth symbol of the +kth subcarrier. Similarly, $D(-k,n)$, $P(-k,n)$ respectively represent the data signal (or its value) and pilot signal (or its value) transmitted as the nth symbol of the -kth subcarrier. The channel estimation preamble signals $L(k)$, $L(-k)$ and pilot signals $P(k,n)$, $P(-k,n)$ are signals whose values are known to the OFDM receiver 200. Further, in FIG. 3, parenthesis for (k), (-k), (k,n), (-k,n) are omitted and k, -k, k,n, -k,n are described in suffixes. This notation similarly applies for FIGS. 7A, 7B, 9A, 9B, 10A and 10B explained later on.

In the first embodiment, the pilot signals are transmitted in the subcarrier numbers of -21, -7, +7, +21. However, this shall not be exclusive, and an arbitrary subcarrier satisfying the following condition 1 can be used.

<Condition 1>: [If the kpth subcarrier is used for transmitting the pilot signal, the -kpth subcarrier will also be used for transmitting the pilot signal.]

According to the earlier nonpatent literature, the combination of pilot signals to be allocated to the -21st, -7th, +7th, +21st subcarriers for the nth symbol is described in equation (1).

$$[P(-21,n),P(-7,n),P(+7,n),P(+21,n)] = [+1 \times PN(n), +1 \times PN(n), +1 \times PN(n), -1 \times PN(n)] \quad (1)$$

Here, PN(n) represents the nth element of the pseudorandom noise (PN) sequence, and takes the value of -1 or +1.

Further, according to the above document 1, the combination of the channel estimation preamble signals to be allocated to the -21st, -7th, +7th, +21st subcarriers is described in equation (2).

$$[L(-21),L(-7),L(+7),L(+21)] = [+1,-1,+1,+1] \quad (2)$$

In the OFDM receiver 200 explained later, when estimating the residual phase offset using the pilot signal and channel estimation preamble signal based on document 1, there is a problem that an error occurs in the residual phase offset estimation due to the influence of IQ imbalance distortion occurred in the OFDM transmitter 100.

Meanwhile, in the first embodiment of the present invention, the channel estimation preamble signals [$L(-21)$, $L(-7)$, $L(+7)$, $L(+21)$] to be allocated to the -21st, -7th, +7th, +21st subcarriers and the pilot signals [$P(-21,n)$, $P(-7,n)$, $P(+7,n)$, P(+21,n)] to be allocated to the −21st, −7th, +7th, +21st subcarriers are set so as to satisfy the following relational expression (3).

$$L(-k)P^*(k,n)=L^*(k)P(-k,n)(k=7,21) \quad (3)$$

Here, * represents a complex conjugate.

More specifically, the OFDM signal in FIG. 3 is configured so that the product of the complex conjugate of the channel estimate preamble signal allocated to the +kth subcarrier and the pilot signal allocated to the −kth subcarrier is equal to the product of the channel estimation preamble signal allocated to the −kth subcarrier and the complex conjugate of the pilot signal allocated to the +kth subcarrier.

As a combination of [P(−21,n), P(−7,n), P(+7,n), P(+21,n)] and [L(−21), L(−7), L(+7), L(+21)] which satisfies the relational expression (3), the combinations of, for example, equations (4), (5), (6), (7) can be cited. In addition, j represents imaginary units.

$$\begin{aligned}[P(-21, n), P(-7, n), P(+7, n), P(+21, n)] = \\ [+1 \times PN(n), +1 \times PN(n), -1 \times PN(n), -1 \times PN(n)] \\ [L(-21), L(-7), L(+7), L(+21)] = \\ [+1, -1, +1, -1]\end{aligned} \quad (4)$$

$$\begin{aligned}[P(-21, n), P(-7, n), P(+7, n), P(+21, n)] = \\ [-1 \times PN(n), -1 \times PN(n), -1 \times PN(n), +1 \times PN(n)] \\ [L(-21), L(-7), L(+7), L(+21)] = \\ [+1, -1, +1, -1]\end{aligned} \quad (5)$$

$$\begin{aligned}[P(-21, n), P(-7, n), P(+7, n), P(+21, n)] = \\ [+j \times PN(n), +j \times PN(n), -j \times PN(n), +j \times PN(n)] \\ [L(-21, n), L(-7), L(+7), L(+21)] = \\ [+1, -j, +j, -1]\end{aligned} \quad (6)$$

$$\begin{aligned}[P(-21, n), P(-7, n), P(+7, n), P(+21, n)] = \\ [+1+j, +1-j, +1-j, +1-j] \\ [L(-21), L(-7), L(+7), L(+21)] = \\ [+1, +1, -j, +1]\end{aligned} \quad (7)$$

The combination of [P(−21,n), P(−7,n), P(+7,n), P(+21,n)] and [L(−21), L(−7), L(+7), L(+21)] is not exclusive to the equations (5) to (7), therefore, it is possible to use other various combinations which satisfy the relational expression (3). In the OFDM receiver 200, the residual phase offset is estimated using such pilot signals and channel estimation preamble signals. In such case, it will be possible to estimate the residual phase offset with high accuracy, without being effected by the IQ imbalance distortion occurred in the OFDM transmitter 100 as will be explained later on.

Figure 4:
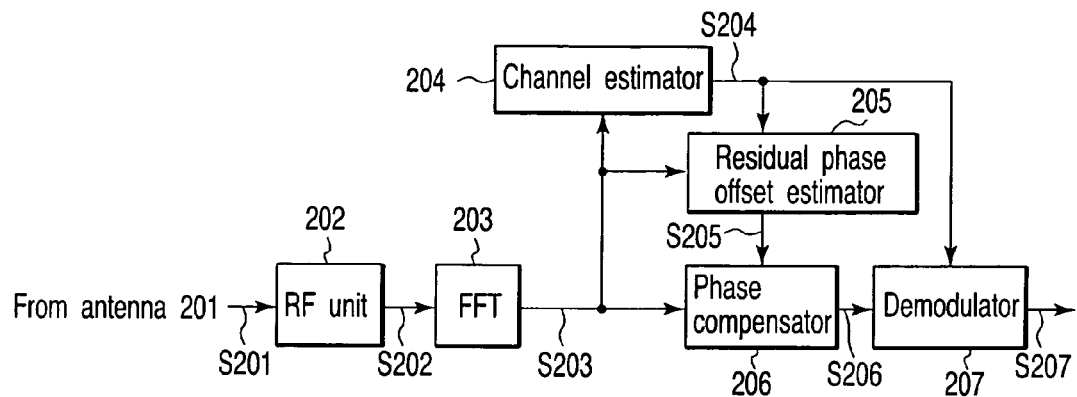
FIG. 4 is a block diagram of an OFDM receiver according to the first embodiment.

The OFDM receiver 200 in FIG. 1 will be explained using FIG. 4. The OFDM receiver 200 comprises an RF unit 202, an FFT (fast Fourier transformation) unit 203, a channel estimator 204, a residual phase offset estimator 205, a phase compensator 206 and a demodulator 207.

The RF unit 202 converts the OFDM signal S201 received by the receiving antenna 201 into a baseband by frequency conversion, then into a digital signal S202. The digital signal S202 is subject to fast Fourier transformation by the FFT unit 203 and is divided into signals S203 for each subcarrier. Among the output signals from the FFT unit 203, signals in the OFDM signal zone including the channel estimation preamble signal are input to the channel estimator 204.

The channel estimator 204 estimates the channel response for each subcarrier using the signal of the channel estimation preamble signal zone, i.e., the received channel estimation preamble signal, and outputs the estimation value S204 of the channel response to the residual phase offset estimation unit 205 and the demodulator 207.

The residual phase offset estimator 205 estimates the residual phase offset component attributable to frequency offset and clock offset using the signal in the OFDM signal zone (pilot signal), which includes the pilot signal within the receiving signal S203, and the channel response estimation value S204, and outputs the estimation value S205 of the residual phase offset to the phase compensator 206.

The phase compensator 206 carries out phase compensation for the signal (data signal) in the OFDM signal zone, which includes data signal within the receiving signal S203, using the estimation value S205 of the residual phase offset, and outputs the compensated data signal S206 to the demodulator 207. The demodulator 207 outputs the demodulated output signal S207.

The operations of the channel estimator 204 and the residual phase offset estimator 205 are basically the same. The operations of the commonly known channel estimator 204 and the residual phase offset estimator 205 will be explained by way of equations hereafter. In the following explanations, an environment is assumed in which an IQ imbalance distortion occurs in the RF unit 108 of the OFDM transmitter 100. In addition, an environment is assumed in which the pilot signal received by the +kth subcarrier of the nth symbol is subject to phase rotation of θ(k,n) [rad] with respect to the channel estimation preamble signal due to residual phase offset attributable to frequency offset and clock offset. Further, for simplicity, it is assumed that there are no time jitters of channels within frames, no time jitters of residual phase offset within symbols, and no thermal noise.

Firstly, the operation of the channel estimator 204 will be explained. The channel estimation preamble signal (receiving preamble signal) $L_{rx}(k)$ allocated to the +kth subcarrier within the received signal is represented by the following equation.

$$L_{rx}(k)=h(k)(\alpha_{IQ}L(k)+\beta_{IQ}L^*(-k)) \quad (8)$$

Here, h(k) is the channel response for the +kth subcarrier, L(k) is the channel estimation preamble signal allocated to the +kth subcarrier, L*(−k) is the complex conjugate of the channel estimation preamble signal allocated to the −kth subcarrier, and $\alpha_{IQ}$, $\beta_{IQ}$ are the complex coefficient occurred under the influence of the IQ imbalance. When the IQ imbalance does not occur, $\alpha_{IQ}=1$, $\beta_{IQ}=0$.

In an environment where the IQ imbalance occurs, it is known that the signal for the +kth subcarrier is subject to interference by the signal of the −kth subcarrier as shown in the equation (8). The channel estimator 204 obtains the estimation value $h_{est}(k)$ of the channel response for the +kth subcarrier by dividing the receiving channel estimation preamble signal $L_{rx}(k)$ in the +kth subcarrier by the channel estimation preamble signal L(k), which is a known signal, in advance as shown in the following equation.

$$h_{est}(k)=L_{rx}(k)/L(k)=h_k(\alpha_{IQ}+\beta_{IQ}L^*(-k)/L(k)) \quad (9)$$

The operation of the residual phase offset estimator 205 will be explained. The pilot signal (the receiving pilot signal) $P_{rx}(k,n)$ allocated to the +kth subcarrier of the nth symbol within the receiving signal is represented by the following equation.

$$P_{rx}(k,n)=h(k)\exp(j\theta(k,n))(\alpha_{IQ}P(k,n)+\beta_{IQ}P^*(-k,n)) \quad (10)$$

Here, P(k,n) is the pilot signal allocated to the +kth subcarrier, and P*(−k,n) is the complex conjugate of the pilot signal allocated to the −kth subcarrier.

As shown in equation (10), not only does the signal of the kth subcarrier for the pilot signal $P_{rx}(k,n)$ undergo interference from the −kth subcarrier under the influence of the IQ imbalance, but also does the pilot signal $P_{rx}(k,n)$ undergo phase rotation due to the residual phase offset component θ(k,n).

In the residual phase offset estimator 205, firstly, a replica signal of the pilot signal $P_{est}(k,n)$ to use for detecting residual phase offset is generated by multiplying the estimation value $h_{est}(k)$ of the channel response and a known signal corresponding to the pilot signal P(k,n) as shown in the next equation.

$$P_{est}(k, n) = h_{est}(k)P(k, n) \quad (11)$$
$$= h(k)\alpha_{IQ}P(k, n) + \beta_{IQ}L^*(-k)P(k, n)/L(k)$$

Then, the residual phase offset estimator 205 obtains the phase difference $\theta_{est}(k,n)$ between the receiving pilot signal $P_{rx}(k,n)$ and the standard signal $P_{est}(k,n)$ as the estimation value of the residual phase offset θ(k,n) as shown in the following equation.

$$\theta_{est}(k, n) = \arg\left(\frac{P_{rx}(k, n)}{P_{est}(k, n)}\right) \quad (12)$$
$$= \arg\left(\frac{\exp(j\theta(k, n))(\alpha_{IQ}P(k, n) + \beta_{IQ}P^*(-k, n))}{\alpha_{IQ}P(k, n) + \beta_{IQ}L^*(-k)P(k, n)/L(k)}\right)$$

Here, arg(*) is a calculation to obtain the deflection angle of a complex number.

The case in which the IQ imbalance does not occur in the RF unit 108 will now be considered ($\alpha_{IQ}=1$, $\beta_{IQ}=0$). In either case of using the pilot signal and channel estimation preamble signal described in document 1 (refer to equations (1) and (2)) or the pilot signal and channel estimation preamble signal satisfying the relational equation (3) (such as the combination of (4), (5), (6) and (7)), the residual phase offset estimation value can be represented by the next equation, and it is appreciated that an accurate residual phase offset value θ(k,n) can be estimated.

$$\theta_{est}(k, n) = \arg\left(\frac{\exp(j\theta(k, n))(1 \times P(k, n) + 0 \times P^*(-k, n))}{1 \times P(k, n) + 0 \times L^*(-k)P(k, n)/L(k)}\right) \quad (13)$$
$$= \arg(\exp(j\theta(k, n)))$$
$$= \theta(k, n)$$

The case in which the IQ imbalance occurs in the RF unit 108 will now be considered ($\alpha_{IQ}\neq 1$, $\beta_{IQ}\neq 0$). When using the pilot signal and channel estimation preamble signal used in document 1 (refer to equation (1) and (2)), the estimation value of the residual phase offset for k=−7 can be represented by the next equation, where the residual phase offset cannot be estimated accurately.

$$\theta_{est}(-7, n) = \arg\left(\frac{\exp(j\theta(-7, n))(\alpha_{IQ}P(-7, n) + \beta_{IQ}P^*(+7, n))}{\alpha_{IQ}P(-7, n) + \beta_{IQ}L^*(+7)P(-7, n)/L(-7)}\right) \quad (14)$$
$$= \arg\left(\frac{\exp(j\theta(-7, n))\left\{\begin{array}{l}\alpha_{IQ} \times (1 \times PN_n) + \\ \beta_{IQ} \times (1 \times PN_n)\end{array}\right\}}{\alpha_{IQ} \times 1 \times PN_n + \beta_{IQ} \times 1 \times (1 \times PN_n)/(-1)}\right)$$
$$= \arg\left(\frac{\exp(j\theta(-7, n))(\alpha_{IQ} + \beta_{IQ})}{\alpha_{IQ} - \beta_{IQ}}\right)$$
$$\neq \theta(-7, n)$$

Meanwhile, when using the pilot signal and the channel estimation preamble signal satisfying the relational equation (3) used in the present embodiment (such as, the combination of equations (4), (5), (6), and (7)), the estimation value of the residual phase offset can be represented by equation (15) by substituting equation (3) to equation (13), and an accurate residual phase offset value can be estimated.

$$\theta_{est}(k, n) = \arg\left(\frac{\exp(j\theta(-k, n))(\alpha_{IQ}P(-k, n) + \beta_{IQ}P^*(+k, n))}{\alpha_{IQ}P(-k, n) + \beta_{IQ}L^*(+k)P(-k, n)/L(-k)}\right) \quad (15)$$
$$= \arg\left(\frac{\exp(j\theta(-k, n))\left(\begin{array}{l}\alpha_{IQ}P(-k, n) + \\ \beta_{IQ}L^*(+k)P(-k, n)/L(-k)\end{array}\right)}{\alpha_{IQ}P(-k, n) + \beta_{IQ}L^*(+k)P(-k, n)/L(-k)}\right)$$
$$= \arg(\exp(j\theta(+k, n)))$$
$$= \theta(k, n)$$

As explained above, the OFDM transmitter according to the present embodiment transmits the pilot signal and channel estimation preamble signal satisfying the relational equation (3). By estimating the residual phase offset using the pilot signal and channel estimation preamble signal which satisfy the relational equation (3), the OFDM receiver is able to estimate the residual phase offset with high accuracy even in an environment where the IQ imbalance distortion exists. Accordingly, the compensation accuracy of the residual phase offset can be improved.

SECOND EMBODIMENT

Figure 5:
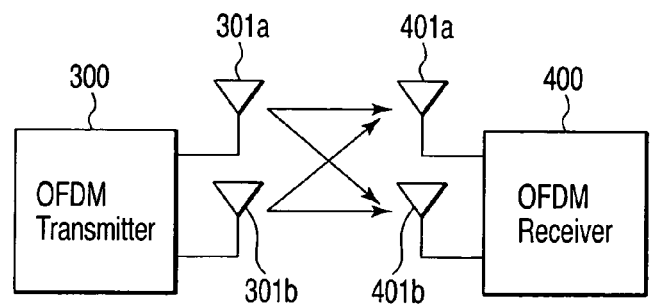
FIG. 5 illustrates the OFDM communication system according to second, third and fourth embodiments.

In the second embodiment, the present invention will be applied to an OFDM communication system using multi-input multi-output (MIMO). As shown in FIG. 5, in an OFDM communication system according to the second embodiment of the present invention, an OFDM signal is transmitted by an OFDM transmitter 300 possessing a plurality of transmit antennas 301*a* and 301*b*. The transmitted OFDM signals are received by an OFDM receiver 400 which possesses a plurality of receiving antennas 401*a* and 401*b*. Here, it explains the case where the OFDM transmitter 300 possesses two transmit antennas 301*a* and 301*b*, and the OFDM receiver 400 possesses two receiving antennas 401*a* and 401*b*. However, this is not exclusive, and the present embodiment is effective also in the case where there are three or more transmit antennas and receiving antennas.

The structure of the OFDM transmitter 300 shown in FIG. 5 will be explained using FIG. 6. The OFDM transmitter 300 possesses an encoder 302, a serial parallel converter 303, digital modulators 304*a* and 304*b*, serial-parallel converters 305a and 305b, pilot signal inserters 306a and 306b, preamble signal adders 307a and 307b, IFFT (inverse fast Fourier transformation) units 308a and 308b and RF units 309a and 309b.

The input transmitting data S301 is coded by the encoder 302. The coded data S302 is subject to serial-parallel conversion by the serial-parallel converter 303 to be distributed into a first transmit data S303a corresponding to the transmit antenna 301a and a second transmit data S303b corresponding to the transmit antenna 301b. The first transmit data S303a and the second transmit data S303b are subject to digital modulation, such as by BPSK, QPSK, 16QAM and 64QAM, respectively by the digital modulators 304a and 304b.

The modulated data S304a and S304b output from the digital modulators 304a and 304b are distributed into data subcarriers used for transmitting a plurality of data signals, by the serial-parallel converters 305a and 305b, respectively. The modulated data S305a and S305b distributed into a plurality of data subcarriers are input to the pilot signal inserters 306a and 306b, respectively.

The pilot signal inserters 306a and 306b insert pilot signals into subcarriers allocated between the data subcarriers S305a and S305b. The signals S306a and S306b output from the pilot signal inserters 306a and 306b are respectively input to the preamble signal adders 307a and 307b.

The preamble signal adders 307a and 307b add channel estimation preamble signals for channel estimation before the signals S306a and S306b. The signals S307a and S307b output from the preamble signal adders 307a and 307b are subject to an inverse fast Fourier transformation by the IFFT units 308a and 308b, respectively. As a result of the inverse fast Fourier transformation, the signals S307a and S307b are converted into OFDM signals S308a and S308b on the time axis, and are respectively input to the RF units 309a and 309b.

The RF units 309a and 309b convert the OFDM signals S308a and S308b on the time axis into analog signals, then, after converting them into wireless frequencies, transmit them respectively via transmit antennas 301a and 301b. As the RF units 309a and 309b are in general configuration, including, for example, a digital-analog converter, a quadrature modulator, a filter or a power amplifier, detailed explanations thereof will be omitted.

Figures 7A, 7B:
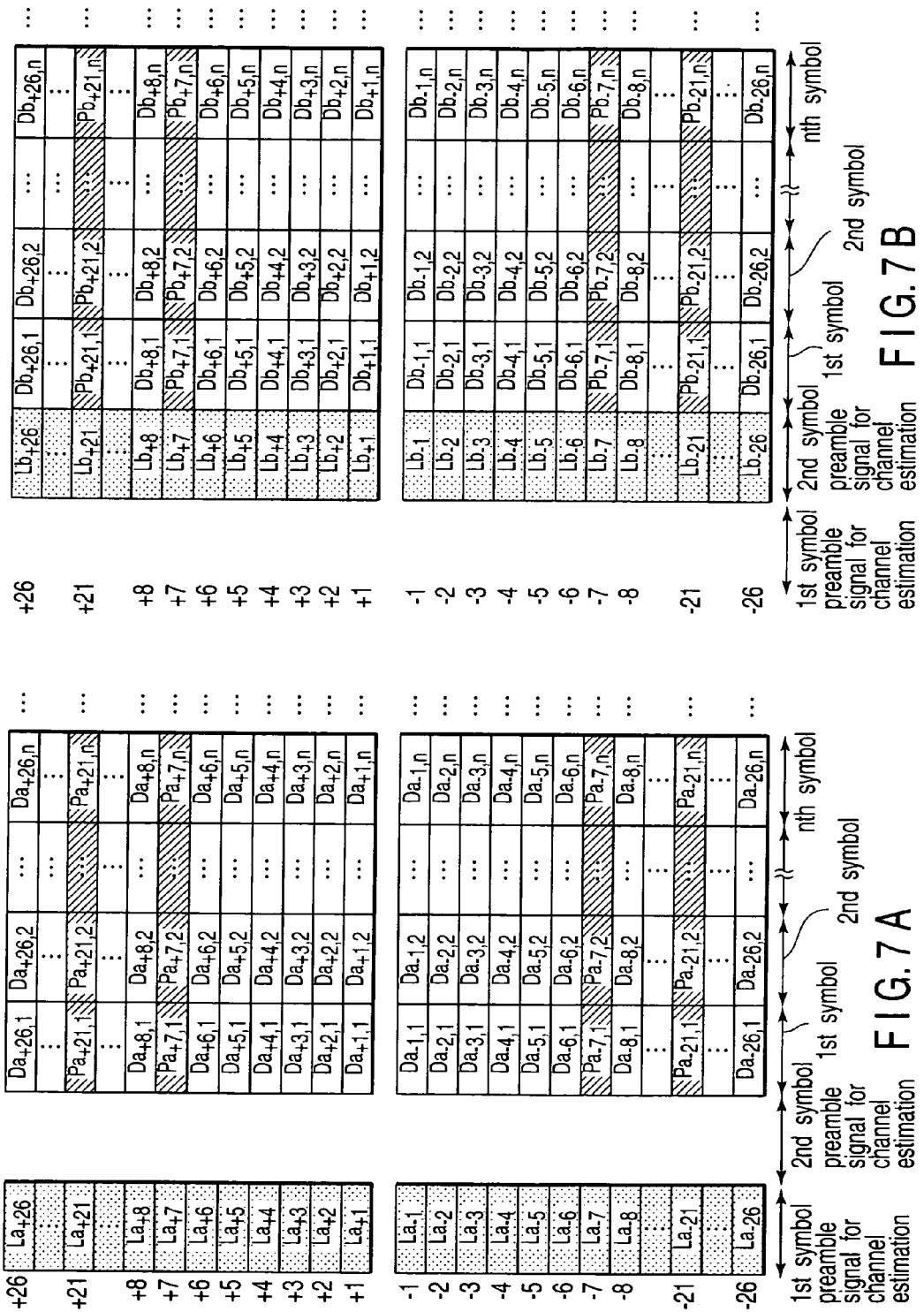
FIG. 7A illustrates the subcarrier arrangement of the OFDM signal transmitted according to the second embodiment.
FIG. 7B illustrates the subcarrier arrangement of the OFDM signal transmitted according to the second embodiment.

The frame structure of the OFDM signal transmitted by the OFDM transmitter 300 will be explained in detail, particularly, with regard to the structures of the channel estimation preamble signal and the pilot signal, using FIGS. 7A and 7B. Likewise FIG. 3, in FIGS. 7A and 7B, the horizontal axis represents time whereas the vertical axis represents frequency (subcarrier number). As shown typically in FIGS. 7A and 7B, the OFDM transmitter 300 in the present embodiment generates two OFDM signals from two different transmit data, and transmits these signals from different transmit antennas 301a and 301b. FIGS. 7A and 7B are frame structures of each of the OFDM signals transmitted from the transmit antennas 301a and 301b.

The OFDM transmitter 300 transmits channel estimation preamble signals La(k), Lb(k) prior to transmitting the data signal. Here, La(k) represents the value of the channel estimation preamble signal to be allocated to the +kth subcarrier from the transmit antenna 301a, and Lb(k) represents the value of the channel estimation preamble signal to be allocated to the +kth subcarrier from the transmit antenna 301b.

In the present embodiment, the OFDM transmitter 300 transmits the channel estimation preamble signals La(k) and Lb(k) from the transmit antennas 301a and 301b as a first OFDM signal of two symbols in different time zones so as to estimate the channel response from the transmit antenna 301a to reception antennas 401a and 401b, and the channel response from the transmit antenna 301b to reception antennas 401a and 401b individually, in the OFDM receiver 400. In other words, in the first symbol of the first OFDM signal, La(k) is transmitted only from the transmit antenna 301a, and no signal is transmitted from the transmit antenna 301b during such period. Meanwhile, in the second symbol of the first OFDM signal, Lb(k) is transmitted from only the transmit antenna 301b, and no signal is transmitted from the transmit antenna 301a during such period.

In such manner, after the first OFDM signal, which is the channel estimation preamble signal, is transmitted, data signals Da(k,n), Db(k,n) and pilot signals Pa(k,n), Pb(k,n) are simultaneously transmitted from the transmit antennas 301a and 301b as a second OFDM signal. Here, Da(k,n), Pa(k,n) represent the value of the data signal and the value of the pilot signal, respectively, which are transmitted to the nth symbol of the +kth subcarrier from the transmit antenna 301a. In addition, Db(k,n), Pb(k,n) represent the value of the data signal and the value of the pilot signal, respectively, which are transmitted to the nth symbol of the +kth subcarrier from the transmit antenna 301b. The channel estimation preamble signals La(k), Lb(k) and pilot signals Pa(k,n), Pb(k,n) are known signals in the OFDM receiver 400.

In the second embodiment, the subcarrier numbers used for the pilot signal transmission are −21, −7, +7, +21. However, this shall not be restricted, and an arbitrary subcarrier satisfying the following condition 2 can also be used.

<Condition 2>: [If the kpth subcarrier is used for pilot signal transmission, the −kpth subcarrier will also be used for pilot signal transmission.]

Also, in the present embodiment, each transmit antenna transmits pilot signals and channel estimation preamble signals which satisfy the earlier relational equation (3). In other words, the pilot signals [Pa(−21,n), Pa(−7,n), Pa(+7,n), Pa(+21,n)] and the channel estimation preamble signals [La(−21), La(−7), La(+7), La(+21)] allocated to the $-21^{st}$, $-7^{th}$, $+7^{th}$, $+21^{st}$ subcarriers transmitted from the transmit antenna 301a are set so as to satisfy the following relational equation (16).

$$La(-k)Pa^*(k,n)=La^*(k)Pa(-k,n)(k=+7,+21) \quad (16)$$

Further, the pilot signals [Pb(−21,n), Pb(−7,n), Pb(+7,n), Pb(+21,n)] and the channel estimation preamble signals [Lb(−21), Lb(−7), Lb(+7), Lb(+21)] allocated to the $-21^{st}$, $-7^{th}$, $+7^{th}$, $+21^{st}$ subcarriers transmitted from the transmit antenna 301b are set so as to satisfy the following relational equation (17).

$$Lb(-k)Pb^*(k,n)=Lb^*(k)Pb(-k,n)(k=+7,+21) \quad (17)$$

As mentioned above, in the present embodiment, the OFDM signals in FIGS. 7A and 7B are configured so that the product of the complex conjugate of the channel estimate preamble signal allocated to the +kth subcarrier and the pilot signal allocated to the −kth subcarrier is equal to the product of the channel estimation preamble signal allocated to the −kth subcarrier and the complex conjugate of the pilot signal allocated to the +kth subcarrier, for each of the transmit antennas 301a and 301b.

In the latter described OFDM receiver 400, when estimating the residual phase offset using the pilot signal and channel estimation preamble signal based on the present embodiment, it will be possible to estimate the residual phase offset with high accuracy without coming under the influence of the IQ imbalance distortion occurred in the OFDM transmitter 300.

An OFDM receiver 400 in FIG. 5 will be explained using FIG. 8. The OFDM receiver 400 possesses RF units 402a and 402b, FFT (fast Fourier transformation) units 403a and 403b, a channel estimator 404, a residual phase offset estimator 405, a phase compensator 406 and a MIMO demodulator 407.

In each of the RF units 402a and 402b, the OFDM signals S401a and S401b received by the receiving antennas 401a and 401b are converted into a baseband by frequency conversion, then, into digital signals S402a and S402b. Each of the digital signals S402a and S402b are input to the FFT units 403a and 403b, subject to fast Fourier transformation and are divided into signals S403a and S403b of each subcarrier.

Among the output signals from the FFT units 403a and 403b, the signals in the channel estimation preamble signal zone are input to the channel estimator 404. The channel estimator 404 estimates the channel response for each subcarrier from each transmit antenna of the OFDM transmitter 300 to each receiving antenna of the OFDM receiver 400 using the received channel estimation preamble signal. Further, the channel estimator 404 outputs the channel response estimation value S404 to the residual phase offset estimator 405 and the MIMO demodulator 407. The MIMO demodulator 407 outputs the demodulated output signal S407.

The residual phase offset estimator 405 estimates the residual phase offset component attributable to the frequency offset and clock offset using the channel response estimation value S404 and the pilot signal included in the received signals S403a and S403b. Further, the residual phase offset estimator 405 outputs the estimate value S405 of the residual phase offset to the phase compensator 406.

The phase compensator 406 carries out phase compensation of the data signal included in the received signals S403a and S403b using the estimation value S405 of the residual phase offset, and outputs the compensated data S406a and S406b to the MIMO demodulator 407.

As illustrated in FIG. 5, since each of the receiving antennas 401a and 401b receive signals which are the combined signals of transmit antennas 301a and 301b, the MIMO demodulator 407 separates such signals transmitted from the transmit antennas 301a and 301b. Explanations on this separation process will be omitted as a known technique, such as a spatial filtering method and maximum likelihood estimation method, can be used.

The operations of the channel estimator 404 and residual phase offset estimator 405 are basically the same as conventionally operated. Hereinafter, the generally known operations of the channel estimator 404 and residual phase offset estimator 405 will be explained by mathematical equation. In the explanation below, an environment is assumed in which a different IQ imbalance distortion occurs in the RF units 309a and 309b of the OFDM transmitter 300. In addition, an environment is assumed in which the pilot signal received by the nth symbol of the +kth subcarrier is subject to phase rotation of θ(k,n) [rad] with respect to the channel estimation preamble signal due to residual phase offset attributable to frequency offset and clock offset. Further, for simplicity, it is assumed that there are no time jitters of channels within frames, no time jitters of residual phase offset within symbols, no residual phase offset within the signal zone of the channel estimation preamble signal, and no thermal noise.

Firstly, the operation of the channel estimator 404 will be explained. The channel estimation preamble signal $L_{rx}aa(k)$ received by the +kth subcarrier of the $1^{st}$ symbol by the receiving antenna 401a is represented by the following equation.

$$L_{rx}aa(k)=haa(k)(\alpha a_{IQ}La(k)+\beta a_{IQ}La^*(-k)) \tag{18}$$

Here, haa(k) is the channel response for the +kth subcarrier from the transmit antenna 301a to the receiving antenna 401a, and $\alpha a_{IQ}$, $\beta a_{IQ}$ are the coefficient of the complex occurred under the influence of the IQ imbalance of the RF unit 309a.

Similarly, the channel estimation preamble signal $L_{rx}ba(k)$ received by the +kth subcarrier of the $2^{nd}$ symbol by the receiving antenna 401a is represented by the following equation.

$$L_{rx}ba(k)=hba(k)(\alpha b_{IQ}Lb(k)+\beta b_{IQ}Lb^*(-k)) \tag{19}$$

Here, hba(k) is the channel response for the +kth subcarrier from the transmit antenna 301b to the receiving antenna 401a, and $\alpha b_{IQ}$, $\beta b_{IQ}$ are the coefficients of the complex occurred under the influence of the IQ imbalance of the RF unit 309b.

Similarly, the channel estimation preamble signal $L_{rx}ab(k)$ received by the +kth subcarrier of the $1^{st}$ symbol by the receiving antenna 401b is represented by the following equation.

$$L_{rx}ab(k)=hab(k)(\alpha a_{IQ}La(k)+\beta a_{IQ}La^*(-k)) \tag{20}$$

Here, hab(k) is the channel response for the +kth subcarrier from the transmit antenna 301a to the receiving antenna 401b.

Similarly, the channel estimation preamble signal $L_{rx}bb(k)$ received by the +kth subcarrier of the $2^{nd}$ symbol by the receiving antenna 401b is represented by the following equation.

$$L_{rx}bb(k)=hbb(k)(\alpha b_{IQ}Lb(k)+\beta b_{IQ}Lb^*(-k)) \tag{21}$$

Here, hbb(k) is the channel response for the +kth subcarrier from the transmit antenna 301b to the receiving antenna 401b.

In the channel estimator 404, the estimation value $h_{est}aa(k)$ of the channel response for the +kth subcarrier from the transmit antenna 301a to the receiving antenna 401a is obtained by dividing the channel estimation preamble signal $L_{rx}aa(k)$ received by the +kth subcarrier of the $1^{st}$ symbol at the receiving antenna 401a by the known La(k) in advance as shown in the following equation.

$$\begin{aligned} h_{est}aa(k) &= L_{rx}aa(k)/La(k) \\ &= haa(k)(\alpha a_{IQ} + \beta a_{IQ}La^*(-k)/La(k)) \end{aligned} \tag{22}$$

Similarly, in the channel estimator 404, the estimation value $h_{est}ba(k)$ of the channel response for the +kth subcarrier from the transmit antenna 301b to the receiving antenna 401a is obtained by dividing the channel estimation preamble signal $L_{rx}ba(k)$ received by the +kth subcarrier of the $2^{nd}$ symbol at the receiving antenna 401a by the known Lb(k) in advance as shown in the following equation.

$$\begin{aligned} h_{est}ba(k) &= L_{rx}ba(k)/Lb(k) \\ &= hba(k)(\alpha b_{IQ} + \beta b_{IQ}Lb^*(-k)/Lb(k)) \end{aligned} \tag{23}$$

Similarly, in the channel estimator 404, the estimation value $h_{est}ab(k)$ of the channel response for the +kth subcarrier from the transmit antenna 301a to the receiving antenna 401b is obtained by dividing the channel estimation preamble signal $L_{rx}ab(k)$ received by the +kth subcarrier of the $1^{st}$ symbol at the receiving antenna 401b by the known La(k) in advance as shown in the following equation.

$$h_{est}ab_k = L_{rx}ab(k)/La(k) \quad (24)$$
$$= hab(k)(\alpha a_{IQ} + \beta a_{IQ}La^*(-k)/La(k))$$

Similarly, in the channel estimator 404, the estimation value $h_{est}bb(k)$ of the channel response for the +kth subcarrier from the transmit antenna 301b to the receiving antenna 401b is obtained by dividing the channel estimation preamble signal $L_{rx}bb(k)$ received by the +kth subcarrier of the $2^{nd}$ symbol at the receiving antenna 401b by the known Lb(k) in advance as shown in the following equation.

$$h_{est}bb(k) = L_{rx}bb(k)/Lb(k) \quad (25)$$
$$= hbb(k)(\alpha b_{IQ} + \beta b_{IQ}Lb^*(-k)/Lb(k))$$

The operation of the residual phase offset estimator 405 will be explained. The pilot signal $P_{rx}a(k,n)$ received by the +kth subcarrier of the nth symbol by the receiving antenna 401a is represented by the following equation.

$$P_{rx}(k, n) = \exp(j\theta(k, n))\{haa(k)(\alpha a_{IQ}Pa(k, n) + \quad (26)$$
$$\beta a_{IQ}Pa^*(-k, n)) + hba(k)(\alpha b_{IQ}Pb(k, n) +$$
$$\beta b_{IQ}Pb^*(-k, n))\}$$

Similarly, the pilot signal $P_{rx}b(k,n)$ received by the +kth subcarrier of the nth symbol by the receiving antenna 401b is represented by the following equation.

$$P_{rx}b(k, n) = \exp(j\theta(k, n))\{hab(k)(\alpha a_{IQ}Pa(k, n) + \quad (27)$$
$$\beta a_{IQ}Pa^*(-k, n)) + hbb(k)(\alpha b_{IQ}Pb(k, n) +$$
$$\beta b_{IQ}Pb^*(-k, n))\}$$

Firstly, in the residual phase offset estimator 405, a standard signal $P_{est}a(k,n)$ which is used when detecting the residual phase offset is generated using the channel response estimation values $h_{est}aa(k)$, $h_{est}ba(k)$ and the preliminarily known Pa(k), Pb(k) as shown in the following equation.

$$P_{est}a(k, n) = h_{est}aa(k)Pa(k, n) + h_{est}ba(k)Pb(k, n) \quad (28)$$
$$= haa(k)(\alpha a_{IQ}Pa(k, n) +$$
$$\beta a_{IQ}La^*(-k)Pa(k, n)/La(k)) +$$
$$hba(k)(\alpha b_{IQ}Pb(k, n) +$$
$$\beta b_{IQ}Lb^*(-k, n)Pb(k, n)/Lb(k))$$

Similarly, in the residual phase offset estimator 405, a standard signal $P_{est}b(k,n)$ which is used when detecting the residual phase offset is generated using the channel response estimation values $h_{est}ab(k)$, $h_{est}nn(k)$ and the preliminarily known Pa(k), Pb(k) as shown in the following equation.

$$P_{est}b(k, n) = h_{est}ab(k)Pa(k, n) + h_{est}bb(k)Pb(k, n) \quad (29)$$
$$= hab(k)(\alpha a_{IQ}Pa(k, n) +$$
$$\beta a_{IQ}La^*(-k)Pa(k, n)/La(k) +$$
$$hbb(k)(\alpha b_{IQ}Pb(k, n) +$$
$$\beta b_{IQ}Lb^*(-k)Pb(k, n)/Lb(k))$$

Further, the residual phase offset estimator 405 detects the phase difference $\theta_{est}a(k,n)$ between the received pilot signal $P_{rx}a(k,n)$ and the standard signal $P_{est}a(k,n)$ as an estimation value of the residual phase offset $\theta(k,n)$ as shown in the following equation.

$$\theta_{est}a(k, n) = \arg\left(\frac{P_{rx}a(k, n)}{P_{est}a(k, n)}\right) = \arg\left(\exp(j\theta(k, n))\frac{A}{B}\right) \quad (30)$$
$$A = haa(k)(\alpha a_{IQ}Pa(k, n) + \beta a_{IQ}Pa^*(-k, n)) +$$
$$hba(k)(\alpha b_{IQ}Pb(k, n) + \beta b_{IQ}Pb^*(-k, n))$$
$$B = haa(k)(\alpha a_{IQ}Pa(k, n) + \beta a_{IQ}La^*(-k)Pa(k, n)/La(k)) +$$
$$hba(k)(\alpha b_{IQ}Pb(k, n) + \beta b_{IQ}Lb^*(-k, n)Pb(k, n)/Lb(k))$$

Similarly, the residual phase offset estimator 405 detects the phase difference $\theta_{est}b(k,n)$ between the received pilot signal $P_{rx}b(k,n)$ and the standard signal $P_{est}b(k,n)$ as an estimation value of the residual phase offset $\theta(k,n)$ as shown in the following equation.

$$\theta_{est}b(k, n) = \arg\left(\frac{P_{rx}b(k, n)}{P_{est}b(k, n)}\right) = \arg\left(\exp(j\theta(k, n))\frac{C}{D}\right) \quad (31)$$
$$C = hab(k)(\alpha a_{IQ}Pa(k, n) + \beta a_{IQ}Pa^*(-k, n)) +$$
$$hbb(k)(\alpha b_{IQ}Pb(k, n) + \beta b_{IQ}Pb^*(-k, n))$$
$$D = hab(k)(\alpha a_{IQ}Pa(k, n) + \beta a_{IQ}La^*Pa(k, n)/La(k)) +$$
$$hbb(k)(\alpha b_{IQ}Pb(k, n) + \beta b_{IQ}Lb^*(-k)Pb(k, n)/Lb(k))$$

In order for the pilot signal and channel estimation preamble signal according to the present embodiment to satisfy equations (16) and (17), equations (30) and (31) are each represented as equations (32) and (33). Therefore, it is appreciated that an accurate residual phase offset value $\theta(k,n)$ is estimated.

$$\theta_{est}a(k, n) = \arg\left(\exp(j\theta(k, n))\frac{E}{F}\right) \quad (32)$$
$$= \arg(\exp(j\theta(k, n)))$$
$$= \theta(k, n)$$
$$E = haa(k)(\alpha a_{IQ}Pa(k, n) + \beta a_{IQ}La^*(-k)Pa(-k, n)/La(k)) +$$
$$hba(k)(\alpha b_{IQ}Pb(k, n) + \beta b_{IQ}Lb^*(-k)Pb(k, n)/Lb(k))$$
$$F = haa(k)(\alpha a_{IQ}Pa(k, n) + \beta a_{IQ}La^*(-k)Pa(k, n)/La(k)) +$$
$$hba(k)(\alpha b_{IQ}Pb(k, n) + \beta b_{IQ}Lb^*(-k)Pb(k, n)/Lb(k))$$

-continued $$\theta_{est}b(k,n) = \arg\left(\exp(j\theta(k,n))\frac{G}{H}\right) \quad (33)$$
$$= \arg(\exp(j\theta(k,n)))$$
$$= \theta(k,n)$$

$$G = hab(k)(\alpha a_{IQ}Pa(k,n) + \beta a_{IQ}La^*(-k)Pa(k,n)/La(k)) +$$
$$hbb(k)(\alpha b_{IQ}Pb(k,n) + \beta b_{IQ}Lb^*(-k)Pb(k,n)/Lb(k))$$
$$H = hab(k)(\alpha a_{IQ}Pa(k,n) + \beta a_{IQ}La^*(-k,n)Pa(k,n)/La(k)) +$$
$$hbb(k)(\alpha b_{IQ}Pb(k,n) + \beta b_{IQ}Lb^*(-k)Pb(k,n)/Lb(k))$$

As explained above, the OFDM transmitter of the present embodiment transmits the pilot signal and channel estimation preamble signal which satisfy the relational equation (3) for each transmit antenna as shown in equations (16) and (17). By estimating the residual phase offset using the pilot signal and channel estimation preamble signal satisfying the relational equation (3), the OFDM receiver is able to estimate the residual phase offset with high accuracy even under an environment where an IQ imbalance distortion exists.

Further, in the present embodiment, it is possible to estimate MIMO channel at the receiving side by transmitting the channel estimation preamble signal from each transmitting antennas as an OFDM signal in different time zones, i.e., transmitting by time division multiplex.

THIRD EMBODIMENT

In the third embodiment, the frame structure of the OFDM signal transmitted from each of the transmit antennas 301a and 301b by the OFDM transmitter 300 shown in FIGS. 5 and 6 will be explained particularly with regard to the structures of channel estimation preamble signals and pilot signals.

Figures 9A, 9B:
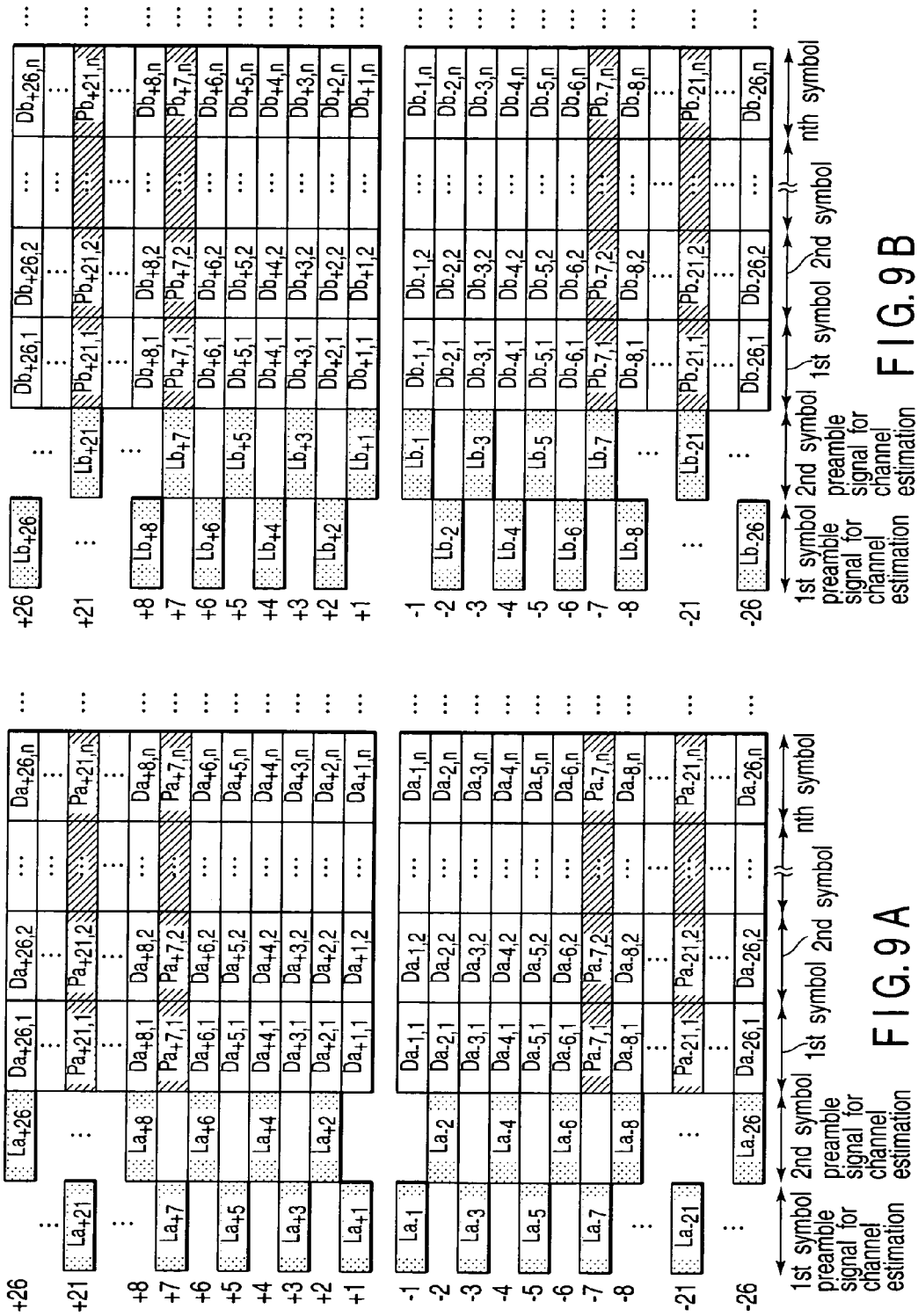
FIG. 9A illustrates the subcarrier arrangement of the OFDM signal transmitted according to the third embodiment.
FIG. 9B illustrates the subcarrier arrangement of the OFDM signal transmitted according to the third embodiment.

As typically illustrated in FIGS. 9A and 9B, in the present embodiment, two OFDM signals are generated from two different transmit data in the OFDM transmitter 300, which are then transmitted from different transmit antennas 301a and 301b. FIGS. 9A and 9B each show the frame structures of the OFDM signals transmitted from transmit antennas 301a and 301b.

The OFDM transmitter 300 transmits the channel estimation preamble signals La(k), Lb(k) prior to transmitting the data signal. Here, La(k) represents the value of the channel estimation preamble signal allocated to the +kth subcarrier from the transmit antenna 301a, and Lb(k) represents the value of the channel estimation preamble signal allocated to the +kth subcarrier from the transmit antenna 301b.

In the present embodiment, the OFDM transmitter 300 transmits the channel estimation preamble signal from each transmit antenna as a first OFDM signal in a respectively different subcarrier arrangement of the same symbol zone, so that the OFDM receiver 400 can estimate the channel response from the transmit antenna 301a to the receiving antennas 401a and 401b, and the channel response from the transmit antenna 301b to the receiving antennas 401a and 401b individually. In other words, in the 1$^{st}$ symbol zone of the channel estimation preamble signal, La(k) is transmitted from the transmit antenna 301a using the odd-numberth subcarrier k=±2i−1 (i=1,2, ..., 13), and Lb(k) is transmitted from the transmit antenna 301b using the even-numberth subcarrier k=±2i (i=1,2, ..., 13). In the 2$^{nd}$ symbol zone of the channel estimation preamble signal, La(k) is transmitted from the transmit antenna 301a using the even-numberth subcarrier k=±2i (i=1,2, ..., 13), and Lb(k) is transmitted from the transmit antenna 301b using the odd-numberth subcarrier k=±2i−1 (i=1,2, ..., 13).

After the channel estimation preamble signals are transmitted, data signals Da(k,n), Db(k,n) and pilot signals Pa(k,n), Pb(k,n) are transmitted simultaneously from the transmit antennas 301a and 301b as a second OFDM signal.

Here, Da(k,n), Pa(k,n) represent the values of the data signal and the pilot signal, respectively, which are allocated to the +kth subcarrier of the nth symbol from the transmit antenna 301a. Db(k,n), Pb(k,n) represent the values of the data signal and the pilot signal, respectively, which are allocated to the +kth subcarrier of the nth symbol from the transmit antenna 301b. The channel estimation preamble signals La(k), Lb(k) and the pilot signals Pa(k,n), Pb(k,n) are known signals in the OFDM receiver 400. In the second embodiment, the subcarrier numbers used for transmitting the pilot signals are −21, −7, +7, +21. However, this shall not be restricted, and an arbitrary subcarrier satisfying the following condition 3 can be used.

<Condition 3>: [If the kpth subcarrier is used for transmitting the pilot signal, the −kpth subcarrier will also be used for transmitting the pilot signal.]

In the present embodiment, each transmit antenna transmits the pilot signal and channel estimation preamble signal satisfying the relational equation (3). In other words, the pilot signals [Pa(−21,n), Pa(−7,n), Pa(+7,n), Pa(+21,n)] and channel estimation preamble signals [La(−21), La(−7), La(+7), La(+21)] allocated to the −21$^{st}$, −7$^{th}$, +7$^{th}$, +21$^{st}$ subcarriers from the transmit antenna 301a are set so as to satisfy the following relational equation (34).

$$La(-k)Pa^*(k,n)=La^*(k)Pa(-k,n)(k=+7,+21) \quad (34)$$

Additionally, the pilot signals [Pb(−21,n), Pb(−7,n), Pb(+7,n), Pb(+21,n)] and channel estimation preamble signals [Lb(−21), Lb(−7), Lb(+7), Lb(+21)] allocated to the −21$^{st}$, −7$^{th}$, +7$^{th}$, +21$^{st}$ subcarriers from the transmit antenna 301b are set so as to satisfy the following relational equation (35).

$$Lb(-k)Pb^*(k,n)=Lb^*(k)Pb(-k,n)(k=+7,+21) \quad (35)$$

In the OFDM receiver 400, when estimating the residual phase offset using the pilot signal and channel estimation preamble signal according to the present embodiment, it is possible to estimate the residual phase offset with high accuracy without coming under influence of an IQ imbalance distortion occurred in the OFDM transmitter 300.

Figure 8:
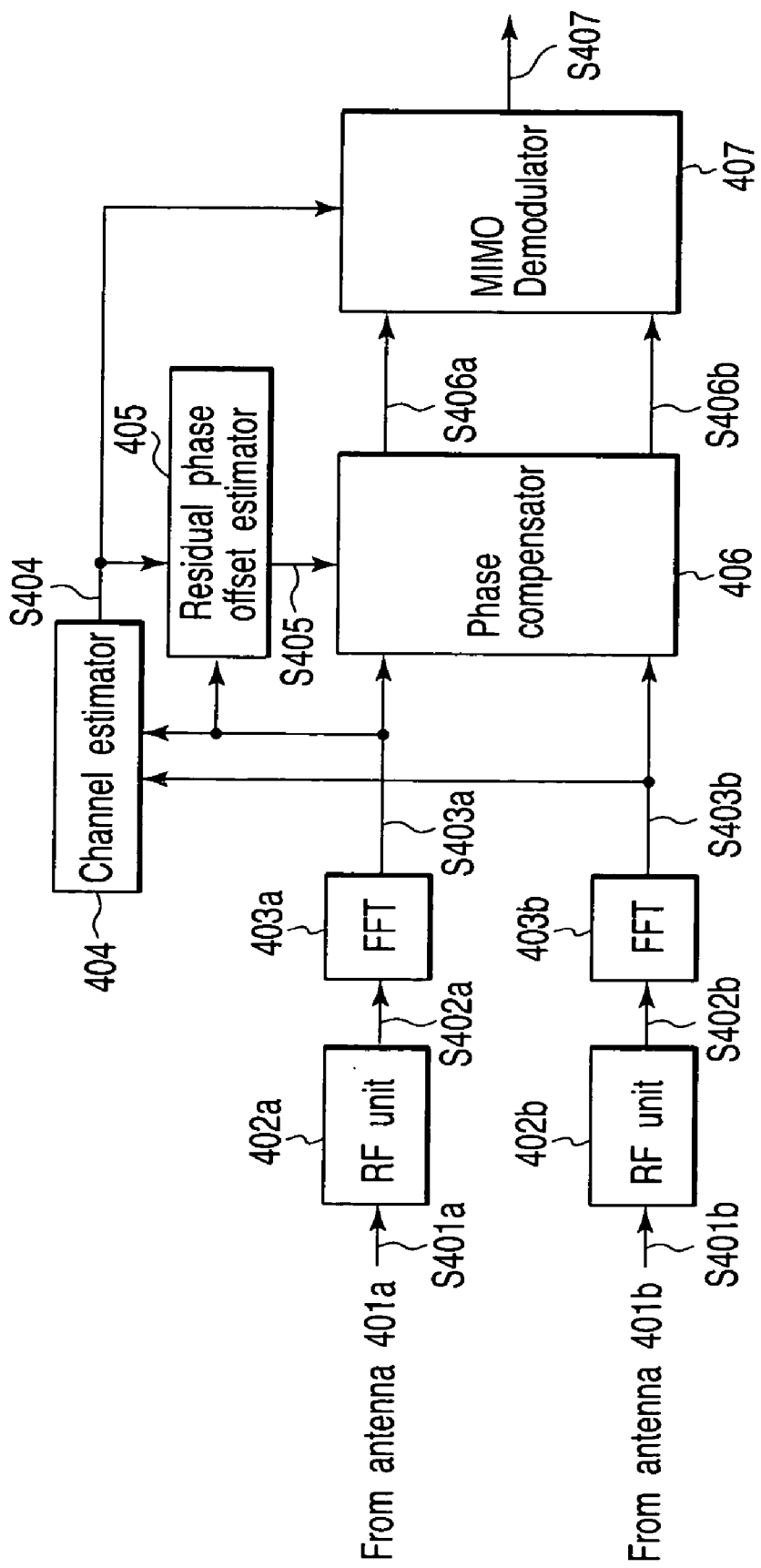
FIG. 8 is a block diagram of the OFDM receiver according to the second, third and fourth embodiments.

Excluding the operation of the channel estimator 404, the OFDM receiver in the present embodiment is the same as the OFDM receiver in FIG. 8 used in the second embodiment. Hereinafter, the operation of the channel estimator 404 used in the present embodiment will be explained by equation. In the following explanation, an environment is assumed in which different IQ imbalance distortions occur in the RF units 309a and 309b of the OFDM transmitter 300. In addition, an environment is assumed in which the pilot signal received by the nth symbol of the +kth subcarrier is subject to phase rotation of θ(k,n) [rad] with respect to the channel estimation preamble signal L(k) due to residual phase offset attributable to frequency offset and clock offset. Further, for simplicity, it is assumed that there are no time jitters of channels within frames, no time jitters of residual phase offset within symbols, no residual phase offset within the signal zone of the channel estimation preamble signal, and no thermal noise.

The channel estimation preamble signal $L_{rx}1a(k)$ received by the +kth subcarrier of the 1$^{st}$ symbol by the receiving antenna 401a is represented by the following equation.

$$L_{rx}1a(k) = \begin{cases} haa(k)(\alpha a_{IQ}La(k) + \beta a_{IQ}La^*(-k)) \\ \text{if } k = 2i-1(i = 1, 2, \ldots, 13) \\ hba(k)(\alpha b_{IQ}Lb(k) + \beta b_{IQ}Lb^*(-k)) \\ \text{if } k = 2i(i = 1, 2, \ldots, 13) \end{cases} \quad (36)$$

Here, haa(k) is the channel response for the +kth subcarrier from the transmit antenna 301a to the receiving antenna 401a, hba (k) is the channel response for the +kth subcarrier from the transmit antenna 301b to the receiving antenna 401a, $\alpha a_{IQ}$, $\beta a_{IQ}$ are the coefficient of the complex occurred under the influence of the IQ imbalance of the RF unit 309a, and $\alpha b_{IQ}$, $\beta b_{IQ}$ are the coefficient of the complex occurred under the influence of the IQ imbalance of the RF unit 309b.

Similarly, the channel estimation preamble signal $L_{rx}2a(k)$ received by the +kth subcarrier of the $2^{nd}$ symbol by the receiving antenna 401a is represented by the following equation.

$$L_{rx}2a(k) = \begin{cases} haa(k)(\alpha a_{IQ}La(k) + \beta a_{IQ}La^*(-k)) \\ \text{if } k = 2i(i = 1, 2, \ldots, 13) \\ hba(k)(\alpha b_{IQ}Lb(k) + \beta b_{IQ}Lb^*(-k)) \\ \text{if } k = 2i-1(i = 1, 2, \ldots, 13) \end{cases} \quad (37)$$

Similarly, the channel estimation preamble signals $L_{rx}1b(k)$, $L_{rx}2b(k)$ received by the +kth subcarrier of the $1^{st}$ symbol and $2^{nd}$ symbol by the receiving antenna 401b are each represented by equations (38) and (39).

$$L_{rx}1b(k) = \begin{cases} hab(k)(\alpha a_{IQ}La(k) + \beta a_{IQ}La^*(-k)) \\ \text{if } k = 2i-1(i = 1, 2, \ldots, 13) \\ hbb(k)(\alpha b_{IQ}Lb(k) + \beta b_{IQ}Lb^*(-k)) \\ \text{if } k = 2i(i = 1, 2, \ldots, 13) \end{cases} \quad (38)$$

$$L_{rx}2b(k) = \begin{cases} hab(k)(\alpha a_{IQ}La(k) + \beta a_{IQ}La^*(-k)) \\ \text{if } k = 2i(i = 1, 2, \ldots, 13) \\ hbb(k)(\alpha b_{IQ}Lb(k) + \beta b_{IQ}Lb^*(-k)) \\ \text{if } k = 2i-1(i = 1, 2, \ldots, 13) \end{cases} \quad (39)$$

Here, hab(k) is the channel response for the +kth subcarrier from the transmit antenna 301a to the receiving antenna 401b, and hbb (k) is the channel response for the +kth subcarrier from the transmit antenna 301b to the receiving antenna 401b.

In the channel estimator 404, the estimation value $h_{est}aa(k)$ of the channel response for the +kth subcarrier from the transmit antenna 301a to the receiving antenna 401a is obtained by dividing the channel estimation preamble signal $L_{rx}1a(k)$ received by the $2i-1^{st}$ subcarrier of the $1^{st}$ symbol and the channel estimation preamble signal $L_{rx}2a(k)$ received by the 2ith subcarrier of the $2^{nd}$ symbol at the receiving antenna 401a respectively by the known La(k) in advance as shown in the following equation.

$$h_{est}aa(k) = \begin{cases} L_{rx}1a(k)/La(k) \\ \text{if } k = 2i-1(i = 1, 2, \ldots, 13) \\ L_{rx}2a(k)/La(k) \\ \text{if } k = 2i(i = 1, 2, \ldots, 13) \end{cases} \quad (40)$$

$$= haa(k)(\alpha a_{IQ} + \beta a_{IQ}La*(-k)/La(k))$$

Similarly, in the channel estimator 404, the estimation value $h_{est}ba(k)$ of the channel response for the +kth subcarrier from the transmit antenna 301b to the receiving antenna 401a is obtained by dividing the channel estimation preamble signal $L_{rx}1a(k)$ received by the 2ith subcarrier of the $1^{st}$ symbol and the channel estimation preamble signal $L_{rx}2a(k)$ received by the $2i-1^{st}$ subcarrier of the $2^{nd}$ symbol at the receiving antenna 401a respectively by the known Lb(k) in advance as shown in the following equation.

$$h_{est}ba(k) = \begin{cases} L_{rx}1a(k)/Lb(k) \\ \text{if } k = 2i(i = 1, 2, \ldots, 13) \\ L_{rx}2a(k)/Lb(k) \\ \text{if } k = 2i-1(i = 1, 2, \ldots, 13) \end{cases} \quad (41)$$

$$= hba(k)(\alpha b_{IQ} + \beta b_{IQ}Lb*(-k)/Lb(k))$$

Similarly, in the channel estimator 404, the estimation value $h_{est}ab(k)$ of the channel response for the +kth subcarrier from the transmit antenna 301a to the receiving antenna 401b is obtained by dividing the channel estimation preamble signal $L_{rx}1b(k)$ received by the $2i-1^{st}$ subcarrier of the $1^{st}$ symbol and the channel estimation preamble signal $L_{rx}2b(k)$ received by the 2ith subcarrier of the $2^{nd}$ symbol at the receiving antenna 401b respectively by the known La(k) in advance as shown in the following equation.

$$h_{est}ab(k) = \begin{cases} L_{rx}1b(k)/La(k) \\ \text{if } k = 2i-1(i = 1, 2, \ldots, 13) \\ L_{rx}2b(k)/La(k) \\ \text{if } k = 2i(i = 1, 2, \ldots, 13) \end{cases} \quad (42)$$

$$= hab(k)(\alpha a_{IQ} + \beta a_{IQ}La*(-k)/La(k))$$

Similarly, in the channel estimator 404, the estimation value $h_{est}bb(k)$ of the channel response for the +kth subcarrier from the transmit antenna 301b to the receiving antenna 401b is obtained by dividing the channel estimation preamble signal $L_{rx}1b(k)$ received by the 2ith subcarrier of the $1^{st}$ symbol and the channel estimation preamble signal $L_{rx}2b(k)$ received by the $2i-1^{st}$ subcarrier of the $2^{nd}$ symbol at the receiving antenna 401b respectively by the known Lb(k) in advance as shown in the following equation.

$$h_{est}bb(k) = \begin{cases} L_{rx}1b(k)/Lb(k) \\ \text{if } k = 2i(i = 1, 2, \ldots, 13) \\ L_{rx}2b(k)/Lb(k) \\ \text{if } k = 2i-1(i = 1, 2, \ldots, 13) \end{cases} \quad (43)$$

$$= hbb(k)(\alpha b_{IQ} + \beta b_{IQ}Lb*(-k)/Lb(k))$$

Likewise the second embodiment, in the present embodiment, the residual phase offset estimator 405 is able to estimate the residual phase offset with high accuracy without coming under influence of the IQ imbalance distortion occurred in the OFDM transmitter 300. Further, it is possible to estimate a MIMO channel at the receiving side by transmitting the channel estimation preamble signal from each transmit antenna as an OFDM signal using different subcarriers, i.e., by frequency division multiplexing.

FOURTH EMBODIMENT

In the fourth embodiment, the frame structure of the OFDM signal transmitted from each of the transmit antennas 301a and 301b by the OFDM transmitter 300 shown in FIGS. 5 and 6 will be explained particularly with regard to the structures of channel estimation preamble signals and pilot signals.

As typically illustrated in FIGS. 10A and 10B, in the present embodiment, two OFDM signals are generated from two different transmit data in the OFDM transmitter 300, which are then transmitted from different transmit antennas 301a and 301b. FIGS. 10A and 10B each show the frame structures of the OFDM signals transmitted from transmit antennas 301a and 301b.

The OFDM transmitter 300 transmits the channel estimation preamble signals La(k), Lb(k) prior to transmitting the data signal. Here, La(k) represents the value of the channel estimation preamble signal allocated to the +kth subcarrier from the transmit antenna 301a, and Lb(k) represents the value of the channel estimation preamble signal allocated to the +kth subcarrier from the transmit antenna 301b.

In the present embodiment, the OFDM transmitter 300 transmits the channel estimation preamble signal as a first OFDM signal in a respectively different orthogonal sequence, so that the OFDM receiver 400 can estimate the channel response from the transmit antenna 301a to the receiving antennas 401a and 401b, and the channel response from the transmit antenna 301b to the receiving antennas 401a and 401b individually. In other words, La(k) is transmitted to the $1^{st}$ symbol, and La(K) is transmitted to the $2^{nd}$ symbol of the first OFDM signal from the transmit antenna 301a as a channel estimation preamble signal, whereas, Lb(k) is transmitted to the $1^{st}$ symbol, and −Lb(k) is transmitted to the $2^{nd}$ symbol of the first OFDM signal from the transmit antenna 301b as a channel estimation preamble signal.

After the first OFDM signal, being the channel estimation preamble signal, is transmitted in such manner, data signals Da(k,n), Db(k,n) and pilot signals Pa(k,n), Pb(k,n) are transmitted from the transmit antennas 301a and 301b simultaneously as a second OFDM signal. Here, Da(k,n), Pa(k,n) represent the values of the data signal and the pilot signal, respectively, which are transmitted in the nth symbol of the +kth subcarrier from the transmit antenna 301a. In addition, Db(k,n), Pb(k,n) represent the values of the data signal and the pilot signal, respectively, which are transmitted in the nth symbol of the +kth subcarrier from the transmit antenna 301b. The channel estimation preamble signals La(k), Lb(k) and the pilot signals Pa(k,n), Pb(k,n) are known signals in the OFDM receiver 400.

In the second embodiment, the subcarrier numbers used for transmitting the pilot signals are −21, −7, +7, +21. However, this shall not be restricted, and an arbitrary subcarrier satisfying the following condition 4 can be used.

<Condition 4>: [If the kpth subcarrier is used for transmitting the pilot signal, the −kpth subcarrier will also be used for transmitting the pilot signal.]

In the present embodiment, each transmit antenna transmits a pilot signal and channel estimation preamble signal satisfying the relational equation (3). In other words, the pilot signals [Pa(−21,n), Pa(−7,n), Pa(+7,n), Pa(+21,n)] and channel estimation preamble signals [La(−21), La(−7), La(+7), La(+21)] allocated to the $-21^{st}$, $-7^{th}$, $+7^{th}$, $+21^{st}$ subcarriers from the transmit antenna 301a are set so as to satisfy the following relational equation (44).

$$La(-k)Pa^*(k,n)=La^*(k)Pa(-k,n)(k=+7,+21) \quad (44)$$

Additionally, the pilot signals [Pb(−21,n), Pb(−7,n), Pb(+7,n), Pb(+21,n)] and channel estimation preamble signals [Lb(−21), Lb(−7), Lb(+7), Lb(+21)] allocated to the $-21^{st}$, $-7^{th}$, $+7^{th}$, $+21^{st}$ subcarriers from the transmit antenna 301b are set so as to satisfy the following relational equation (45).

$$Lb(-k)Pb^*(k,n)=Lb^*(k)Pb(-k,n)(k=+7,+21) \quad (45)$$

In the OFDM receiver 400, when estimating the residual phase offset using the pilot signal and channel estimation preamble signal according to the present embodiment, it is possible to estimate the residual phase offset with high accuracy without coming under influence of an IQ imbalance distortion occurred in the OFDM transmitter 300.

The OFDM receiver in the present embodiment is the same as the OFDM receiver in FIG. 8 used in the second embodiment, excluding the operation of the channel estimator 404. Hereinafter, the operation of the channel estimator 404 used in the present embodiment will be explained by equation. In the following explanation, an environment is assumed in which different IQ imbalance distortions occur in the RF units 309a and 309b of the OFDM transmitter 300. In addition, an environment is assumed in which the pilot signal received by the nth symbol of the +kth subcarrier is subject to phase rotation of θ(k,n) [rad] with respect to the channel estimation preamble signal due to residual phase offset attributable to frequency offset and clock offset. Further, for simplicity, it is assumed that there are no time jitters of channels within frames, no time jitters of residual phase offset within symbols, no residual phase offset within the signal zone of the channel estimation preamble signal, and no thermal noise.

The channel estimation preamble signal $L_{rx}1a(k)$ received by the +kth subcarrier of the $1^{st}$ symbol by the receiving antenna 401a is represent by the following equation.

$$L_{rx}1a(k)=haa(k)(\alpha a_{IQ}La(k)+\beta a_{IQ}La^*(-k))+hba(k)(\alpha b_{IQ}Lb(k)+\beta b_{IQ}Lb^*(-k)) \quad (46)$$

Here, haa(k) is the channel response for the +kth subcarrier from the transmit antenna 301a to the receiving antenna 401a, hba (k) is the channel response for the +kth subcarrier from the transmit antenna 301b to the receiving antenna 401a, $\alpha a_{IQ}$, $\beta a_{IQ}$ are the coefficient of the complex occurred under the influence of the IQ imbalance of the RF unit 309a, and $\alpha b_{IQ}$, $\beta b_{IQ}$ are the coefficient of the complex occurred under the influence of the IQ imbalance of the RF unit 309b.

Similarly, the channel estimation preamble signal $L_{rx}2a(k)$ received by the +kth subcarrier of the $2^{nd}$ symbol by the receiving antenna 401a is represented by the following equation.

$$L_{rx}2a(k)=haa(k)(\alpha a_{IQ}La(k)+\beta a_{IQ}La^*(-k))-hba(k)(\alpha b_{IQ}Lb(k)+\beta b_{IQ}Lb^*(-k)) \quad (47)$$

Similarly, the channel estimation preamble signals $L_{rx}1b(k)$, $L_{rx}2b(k)$ received by the +kth subcarrier of the $1^{st}$ symbol and $2^{nd}$ symbol in the receiving antenna 401b are represented by equations (48) and (49), respectively.

$$L_{rx}1b(k)=hab(k)(\alpha a_{IQ}La(k)+\beta a_{IQ}La^*(-k))+hbb(k)(\alpha b_{IQ}Lb(k)+\beta b_{IQ}Lb^*(-k)) \quad (48)$$

$$L_{rx}2b(k)=hab(k)(\alpha a_{IQ}La(k)+\beta a_{IQ}La^*(-k))-hbb(k)(\alpha b_{IQ}Lb(k)+\beta b_{IQ}Lb^*(-k)) \quad (49)$$

Here, hab(k) is the channel response for the +kth subcarrier from the transmit antenna 301a to the receiving antenna 401b, and hbb (k) is the channel response for the +kth subcarrier from the transmit antenna 301b to the receiving antenna 401b.

In the channel estimator 404, by carrying out the process of the following equation, the estimation value $h_{est}aa(k)$ of the channel response for the +kth subcarrier from the transmit antenna 301a to the receiving antenna 401a is obtained.

$$h_{est}aa(k) = (L_{rx}1a(k) + L_{rx}2a(k))/2La(k) \quad (50)$$
$$= haa(k)(\alpha a_{IQ} + \beta a_{IQ}La*(-k)/La(k))$$

Further, in the channel estimator 404, by carrying out the process of the following equation, the estimation value $h_{est}ba(k)$ of the channel response for the +kth subcarrier from the transmit antenna 301b to the receiving antenna 401a is obtained.

$$h_{est}ba(k) = (L_{rx}1a(k) - L_{rx}2a(k))/2Lb(k) \quad (51)$$
$$= hba(k)(\alpha b_{IQ} + \beta b_{IQ}Lb*(-k)/Lb(k))$$

Further, in the channel estimator 404, by carrying out the process of the following equation, the estimation value $h_{est}ab(k)$ of the channel response for the +kth subcarrier from the transmit antenna 301a to the receiving antenna 401b is obtained.

$$h_{est}ab(k) = (L_{rx}1b(k) + L_{rx}2b(k))/2La(k) \quad (52)$$
$$= hab(k)(\alpha a_{IQ} + \beta a_{IQ}La*(-k)/La(k))$$

Further, in the channel estimator 404, by carrying out the process of the following equation, the estimation value $h_{est}bb(k)$ of the channel response for the +kth subcarrier from the transmit antenna 301b to the receiving antenna 401b is obtained.

$$h_{est}bb(k) = (L_{rx}1b(k) + L_{rx}2b(k))/2Lb(k) \quad (53)$$
$$= hbb(k)(\alpha b_{IQ} + \beta b_{IQ}Lb*(-k)/Lb(k))$$

Likewise the second embodiment, in the present embodiment, the residual phase offset estimator 405 is able to estimate the residual phase offset with high accuracy without coming under influence of the IQ imbalance distortion occurred in the OFDM transmitter 300.

Further, in the present embodiment, the MIMO channel can be estimated at the receiving side by transmitting the channel estimation preamble signal from each transmit antenna as an OFDM signal with respectively different orthogonal sequence (in other words, transmitting by code division multiple).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of transmitting an orthogonal frequency division multiplexing (OFDM) signal comprising:

allocating a first channel estimation preamble signal and a second channel estimation preamble signal for channel response estimation respectively to a +kth subcarrier and a −kth subcarrier (k is at least one arbitrary integer) from a center frequency of a first OFDM signal;

allocating a first pilot signal and a second pilot signal for residual phase offset estimation respectively to the +kth subcarrier and the −kth subcarrier from a center frequency of a second OFDM signal; and transmitting the first OFDM signal and the second OFDM signal respectively in different time zones using at least one antenna, wherein a first product of a complex conjugate of the first channel estimation preamble signal and the second pilot signal is equal to a second product of the second channel estimation preamble signal and the complex conjugate of the first pilot signal.

2. The method according to claim 1, wherein the transmitting uses a plurality of antennas, and the first product is equal to the second product for each of the antennas.

3. The method according to claim 1, further comprising:

allocating a data signal to at least a part of a subcarrier other than the +kth subcarrier and −kth subcarrier of the second OFDM signal.

4. A transmitter of the orthogonal frequency division multiplexing (OFDM) signal comprising:

a first allocation unit configured to allocate a first channel estimation preamble signal and a second channel estimation preamble signal for channel response estimation respectively to a +kth subcarrier and a −kth subcarrier (k is at least one arbitrary integer) from a center frequency of a first OFDM signal;

a second allocation unit configured to allocate a first pilot signal and a second pilot signal for residual phase offset estimation respectively to the +kth subcarrier and the −kth subcarrier from a center frequency of a second OFDM signal; and, a transmission unit configured to transmit the first OFDM signal and the second OFDM signal respectively in different time zones using at least one antenna, wherein a first product of a complex conjugate of the first channel estimation preamble signal and the second pilot signal is equal to a second product of the second channel estimation preamble signal and a complex conjugate of the first pilot signal.

5. The apparatus according to claim 4, wherein the transmission unit uses a plurality of antennas, and the first product is equal to the second product for each of the antennas.

6. The apparatus according to claim 4, further comprising a third allocation unit configured to allocate a data signal to at least part of a subcarrier other than the +kth subcarrier and −kth subcarrier of the second OFDM signal.

7. The apparatus according to claim 6, wherein the transmission unit uses a plurality of antennas, and the data signal has a different value for each of the antennas.

8. The apparatus according to claim 4, wherein the transmission unit is configured to transmit the second OFDM signal simultaneously from a plurality of antennas.

9. The apparatus according to claim 4, wherein the first pilot signal and the second pilot signal respectively have different values for each of the antennas.

10. The apparatus according to claim 4, wherein the transmission unit is configured to transmit the first OFDM signal in different time zones with respect to each of the antennas.

11. The apparatus according to claim 4, wherein the transmission unit is configured to transmit the first OFDM signal using different subcarrier arrangements with respect to each of the antennas.

12. The apparatus according to claim 4, wherein the transmission unit is configured to transmit the first OFDM signal simultaneously from the plurality of antennas.

13. The apparatus according to claim 4, wherein the transmission unit is configured to transmit the first OFDM signal simultaneously from the antennas using different orthogonal sequences for each of the antennas.

14. A receiver of the orthogonal frequency division multiplex (OFDM) signal comprising:
 a receiving unit configured to receive the first OFDM signal and the second OFDM signal transmitted from the apparatus of claim 4, to output a first receiving signal in the first OFDM signal zone, and to output a second receiving signal in the second OFDM signal zone;
 a first estimator to estimate the channel response using the first receiving signal, to obtain a first estimation value;
 a second estimator to estimate the residual phase offset using the first estimation value and the second receiving signal, to obtain a second estimation value;
 a compensator to carry out phase compensation of the data signal using the second estimation value; and,
 a demodulator to demodulate the data signal undergone phase compensation.

15. The apparatus according to claim 14, wherein the second estimator comprises a generator to generate duplicate signals of the first pilot signal by multiplying the first estimation value and a known signal corresponding to the first pilot signal, and a calculating unit configured to calculate the phase difference between the duplicate signal and the first pilot signal within the second receiving signal as the second estimation value.

* * * * *